United States Patent Office 3,488,340
Patented Jan. 6, 1970

3,488,340
PROCESS IN APPLICATION OF B.B FRACTION AS BUTADIENE SOURCE FOR PREPARATION OF POLYMER DERIVED FROM LIVING POLY-BUTADIENE
Michio Hiraoka, Yasukuni Kobayashi, and Takenobu Takase, Tokyo-to, and Akira Nagai, Fujisawa-shi, Japan, assignors to Nippon Soda Kabushiki Kaisha, Tokyo-to, Japan, a company of Japan
No Drawing. Filed Apr. 7, 1965, Ser. No. 446,412
Claims priority, application Japan, Apr. 9, 1964, 39/19,811
Int. Cl. C08f 1/68; C08d 1/20, 3/02
U.S. Cl. 260—94.2                   13 Claims

ABSTRACT OF THE DISCLOSURE

Method of producing living polybutadiene, which comprises reacting the $C_4$ fraction obtained by fractional distillation of cracking gas produced by cracking of naphtha and dehydrogenation of $C_4$-paraffins and $C_4$-olefins, with the dispersion or a film of an alkali metal of the group consisting of sodium, potassium, cesium, rubidium and mixtures thereof, the dispersion having a particle size of less than $50\mu$ average diameter and less than $200\mu$ maximum diameter, in the presence of an activator of the group consisting of condensed ring aromatic hydrocarbons, polynuclear aromatic hydrocarbons constituted of bonded, non-condensed rings, polynuclear aromatic hydrocarbons constituted of bonded, condensed rings, conjugated unsaturated heterocyclic compounds having a vinyl group on a side chain, and diaryl ketones and a Lewis base of the group consisting of alphatic monoethers, aliphatic polyethers, cyclic ethers, acetals, and tertiary amines at a temperature of about $-100°$ C. to $-40°$ C. in an inert gas atmosphere.

---

This invention relates to an improved process for the preparation of polymers derived from living polybutadiene by the use of the so called B.B fraction as the butadiene source. More particularly, this invention relates to a process wherein the purification process of butadiene as starting material, which generally constitutes a large part of the total cost of the process, is omitted, and butadiene contained in the B.B fraction raw material is used as starting material directly and is reacted selectively to produce a polymer having a degree of polymerization of at least two and properties characteristic of a polymer derived from a living polymer, such as narrow distribution of molecular weight and optional attachment of a desired functional group at the end of the polymer chain; other and other components of the B.B fraction act as the diluent and the reaction proceeds smoothly by the dilution of the reaction mixture.

The fiirst object of this invention is to provide an economical and rational process for the preparation of polybutadiene having various average degrees of polymerization of at least two and narrow distribution of molecular weight and being useful in the preparation of paint, latex, plasticizer, adhesive, rubber blending materials, synthetic rubber, casting articles, various intermediates of synthetic chemicals and prepolymers. The second object of the invention is to provide an economical and simple process for the preparation of block and random butadiene copolymers, having desired molecular weight and narrow distribution thereof and being useful in the preparation of the aforesaid materials. Furthermore, the third object of the invention is to provide an economical process for the preparation of polybutadiene and butadiene copolymer having one and/or two functional groups at the ends of the polymer chains, desired molecular weight and narrow distribution thereof and being useful in the preparation of agricultural chemicals, raw materials of high-polymers such as polyurethane, polyester and polyamide, in addition to the aforesaid materials.

In known processes for the preparation of polybutadiene by various polymerizations such as radical polymerization, ionic polymerization and coordinate ionic polymerization, it is necessary to employ as starting material highly purified butadiene, i.e. to a so called polymerization grade of more than 98 percent purity, because in some cases other olefines present with butadiene as impurities are polymerized and the obtained polybutadiene is contaminated by these olefines, and in other cases paraffins and olefines existing as impurities act to terminate or reduce the activity of the catalyst and the polymerization reaction is substantially terminated too. As a result the yield and structure of polybutadiene, rate of polymerization reaction, degree of polymerization and distribution of molecular weight is undesirable. Furthermore, maintenance of the conditions of polymerization such as temperature and pressure become impossible.

It is yet another shortcoming of the known processes that the cost of purification to obtain such high grade of butadiene constituted a large part of the total cost of the polybutadiene, because the purification process comprises a complicated combination of the processes for the separation and refining of the so called B.B fraction consisting of about 10 to 60 weight percent of butadiene and others of $C_4$ fraction, these processes including extraction, extractive distillation, azeotropic distillation, etc. This is the most important problem from the economic standpoint in the preparation of polybutadiene and butadiene copolymer. The present invention appears to answer and solve this problem.

A polymerization process of conjugated diene hydrocarbon such as styrene, isoprene and butadiene and aryl substituted vinyl compounds such as styrene by the catalytic action of aromatic hydrocarbon-alkali metal complex which is prepared by the reaction of a polynuclear aromatic hydrocarbon, such as naphthalene or biphenyl, with an alkali metal in the presence of special ethers such as tetrahydrofuran and 1,2-dimethoxyethane is known as the so-called living polymer synthesis. It is also known that the living polymer has the following characteristic chemical properties: termination does not occur substantially in the polymerization reaction and the activity at each end of the polymeric molecule is maintained so that the average degree of polymerization is expressed as a function of the molar ratio of the used monomer to the alkali metal-aromatic hydrocarbon complex; the polymer prepared in this way has a narrower distribution of molecular weight than in the case of polymers prepared by other known methods, such as radical, ionic and coordinate ionic polymerizations; various functional groups can be introduced at each end of the polymeric chain by treatment of the resulting polymer solution with electrophilic reagents; and block copolymers can be formed easily by the addition of other monomers to the resulting polymer solution.

However, in the case of synthesizing such a living polymer, it is necessary to use a monomer which is more highly purified than that used in conventional polymerization methods and it is necessary to use only Lewis base having a lone pair, such as the aforesaid special ethers, as a solvent and to avoid the presence of hydrocarbons such as toluene, benzene and n-hexane in such a solvent. It is believed that the reason making it necessary to use such strict conditions is based on the fact that the alkali metal counter cation to the hydrocarbon anion of the complex may be stablized only by coordination of Lewis based an the polymerization activity maybe terminated by a reaction between catalyst and/or the living end and such a hydrocarbon and/or impurities in the monomer.

In spite of many valuable characteristics, the living polymer has not been produced on a industrial scale owing to the economical disadvantages resulting from the above restrictions in the reaction conditions.

Investigations relating to the aromatic hydrocarbon-alkali metal complex and the reaction of living polymer were carried out, and as the result, the following facts were determined: The existence of Lewis base as the solvent is needed to form the complex, while on the other hand the complex can not be formed in any other solvent excepting the Lewis base. However, the complex can be formed in the mixed solvent of Lewis base and non- or less-polar hydrocarbon having a larger value of dielectric constant than a defined value. In the initiation process, the polymerization is initiated even in a mixed solvent of Lewis base and hydrocarbon satisfying the above condition of the solvent and polymeric anion is produced. In the propagation process, the lower limit of dielectric constant of the solvent to be capable of propagating is still smaller than that of the initiation process, however, when some kinds of diluent are employed, chain transfer occurs and lowering of the moleculer weight and extension of distribution thereof results. However, these phenomena are substantially prevented by carrying out the propagation reaction at a sufficiently low temperature.

Based on the above empirical results, it was estimated that living polybutadiene would be prepared by introduction of B.B fraction into the mixture of the hydrocarbon-alkali metal complex, Lewis base, and if desired, some diluent, instead of introducing purified butadiene into the mixture of the complex and Lewis base, and by the subsequent experiment, this estimation is demonstrated and the process of this invention is established. That is, paraffins and olefines in B.B fraction act as the diluent in the presence of Lewis base at a greater quantity than the least quantity needed for the formation of the complex and the intiation of polymerization, and butadiene in B.B fraction is reacted to produce living polybutadiene very smoothly, and then polybutadiene and butadiene copolymer, with or without a functional group and characterized by narrow distribution of molecular weight is obtained by additional procedure and/or treatment.

In this process, the known solution of the activator-alkali metal complex in Lewis base is employed as the initiator. However, instead of this solution it is advantageous to use the novel mixture of alkali metal in a form having a large surface area, such as a dispersion or a mirror activator comprising polynuclear aromatic hydrocarbon and diarylketon, etc., plus Lewis base and, if desired, another hydrocarbon.

The novel procedure in which the novel mixture is employed has the following characteristic merit: A controlling of the desired and defined degree of ploymerization is performed very easily by the preliminarily determined quantities of monomer and alkali metal to be used, and it is not necessary to filter, sample and analyze the solution of activator-alkali metal complex. In this process, there is no such error in estimation of polymerization degree as in previous known methods, and the degree of polymerization of the produced polymer is in entirely satisfactory agreement with the calculated value. The process of this invention is carried out as follows: To a reaction vessel replaced by inert gas, Lewis base, an activator and a defined amount of alkali metal having large surface area, such as alkali metal dispersion, are added to produce a mixture containing an activator-alkali metal complex and, if desired, unreacted alkali metal. To the mixture, B.B fraction is added gradually under agitation to produce the living poly-butadiene solution. The polymerization procedure should be carried out in substantial absence of air, oxygen, carbon dioxide and Lewis acid.

In this process, B.B fraction is defined as follows; B.B fraction comprises the $C_4$ fraction obtained by fractional distillation of cracking gas which is produced by catalytic cracking and thermal cracking of naphtha and by dehydrogenation of $C_4$ paraffins and $C_4$ olefins, and such other fractions from which butadiene is separated and from which refined butadiene is obtained by extraction, extraction, extractive distillation and azeotropic distillation, and they are the mixture consisting of butadiene, $C_4$ paraffins, $C_4$ olefins and other minor constituent such as $C_3$ and $C_5$ hydrocarbon and acetylene, etc.

A non-limiting example of a composition of B.B fraction, is shown in Table I.

TABLE I

| Constituent: | | Percent |
|---|---|---|
| Propane | mole | 0.0–1.0 |
| Propylene | do | 0.0–5.0 |
| n-Butane | do | 1.0–50.0 |
| Iso-butane | do | 1.0–20.0 |
| Butene-1 | do | 10.0–60.0 |
| Trans-butene-2 | do | 1.0–20.0 |
| Cis-butene-2 | do | 1.0–20.0 |
| Iso-butylene | do | 1.0–50.0 |
| 1,3-butadiene | do | 10.0–60.0 |
| 1,2-butadiene | do | 0.02–0.2 |
| $C_5$-hydrocarbon | do | 0.0–2.0 |
| Acetylenes | do | 0.0–0.2 |
| Sulphur | p.p.m. | 1–15 |

In this process, Lewis base comprises ethers, acetals, tertiary amines and others employed in the prior known processes as a solvent and illustrated as follows: aliphatic monoethers such as dimethylether and methylethylether; aliphatic polyethers such as 1,2-dimethoxyethane and 2,2′-dimethoxydiethylether; cyclic ethers such as tetrahydrofuran and 1,4-dioxane; acetals such as methylal and 1,1-dimethoxyethane; and tertiary amines such as trimethylamine, triethylamine and N-methylmorpholine. The preferred amount of the Lewis-base is three parts (weight) to one part of alkali metal.

The activator is illustrated as follows: condensed ring aromatic hydrocarbons such as anthracene, naphthalene and phenanthrene; polynuclear aromatic hydrocarbon bonded non-condensed ring compounds such as biphenyl and terphenyls; polynuclear aromatic hydrocarbon bonded condensed ring compounds such as binaphthyls and phenylnaphthalenes; conjugated unsaturated heterocyclic compounds having a vinyl group on a side chain such as 4-vinyl pyridine and 2-vinylfuran; and diaryl ketones such as benzophenone and phenylnaphthyl ketone.

The amount of the activator to be employed is greater than the amount that corresponds to 0.0001 mole per gram-atom of alkali metal.

Lithium, sodium, potassium, rubidium, cesium, their alloys or mixtures and alloys or mixtures of one or more of the aforesaid alkali metals and other metals are included as the alkali metals for use in this invention. They are employed in a form having large surface area, such as fine particles preferably of less than $50\mu$ in average diameter and less than $200\mu$ in maximum diameter and a film. As the particles, a known dispersion of alkali metal may be used successfully. And the mirror may be obtained by a known method comprising heating of the alkali metal in vacuum.

The quantity of alkali metal in the reaction and the quantity of monomer vary by the optionally defined degree of polymerization. A numerical average degree of polymerization of the polymer is explessed by the following formula:

$$\bar{P}n = K[M]/[C]$$

wherein $\bar{P}n$ is the numerical average degree of polymerization, [M] is moles of used monomer and [C] is moles of alkali metal and K is a positive coefficient in a range from 1 to 2 defined from the polymerization temperature in a range from —100° C. to 30° C. At —40° C. or below, K is substantially 2, and it becomes less than 2 according to elevation of the temperature and at higher than 0° C., it becomes substantially 1. Based on the above facts, it is concluded as follows: At a lower temperature, divalent anion is mainly formed initially and then polymeric divalent anion is produced by anionic propagations at both ends of the anion; however, at a higher temperature, monovalent anion is formed mainly in the same stage, and then polymeric monovalent anion is produced by anionic propagation at the only one end; furthermore, at higher than 30° C. the chain transfer occurs violently, and then polymer without anionic end which cannot be called living polymer is produced.

The addition of B.B fraction may be carried out in either gas or liquid state, but the total amount of B.B fraction should not be added at one time. When unreacted alkali metal exists in the mixture containing the complex, it is necessary that the addition of B.B fraction be very slow until the added amount of butadiene reaches a range of from 1 mole to 5 moles to the added alkali metal. This is for the reason that the total amount of the alkali metal should be consumed completely before starting the propagation reaction.

When the polymerization temperature is below —40° C. and the desired and defined degree of polymerization is more than 200, the polymerization mixture becomes so viscous that the agitation is hardly practicable. In such a case, polymerization reaction may be proceeded smoothly by addition of the diluent.

In this process, the diluent comprises the compounds which are not reacted with the activator-alkali metal complex butadiene anion and polybutadiene anion, and they are illustrated as follows: paraffins such as propane, butane, pentane, hexane and heptane; olefines such as propane, butene, pentenes, hexene and heptene; mononuclear aromatic hydrocarbons such as benzene, toluene, xylene and ethylbenzene. B.B fraction not containing butadiene such as C₄ fraction recovered from the polymerization mixture after completion of this process is one of this process is one of the most preferred diluents. The preferred amount of the diluent is the least amount to enable agitating the polymerization mixture at the last stage of the polymerization, and it is practically equal to the amount of the monomer or less. The preferred time of addition of the diluent is after the addition of the B.B. fraction containing from one to five molecules of butadiene per each atom of alkali metal. The addition of the diluent may be conveniently carried out when the diluent is added as the mixture with B.B fraction.

The reaction time of the polymerization is rather short, butadiene is almost polymerized as soon as the B.B fraction is added. If necessary, the reaction solution is stirred for about one hour after the addition of the total amount of B.B fraction. When B.B fraction is added repeatedly after interruption, the polymerization soon proceeds continuously.

A block copolymer, an alternate block copolymer and a random copolymer may be prepared by addition of a comonomer, by further additions of the second and the third monomers, by alternate additions of two or more kinds of comonomer and by addition of a mixture of two or more kinds of comonomer to the mixture containing the living polybutadiene.

The comonomers able to produce the various copolymers and living copolymers are the compounds having the following formula;

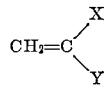

wherein X is selected from the group consisting of hydrogen atom and organic substituents and Y is an organic substituent, and the sum of Hammett's substituent constants of X and Y is in a range from —0.2 to 0.7, other than butadiene. As non-limiting examples thereof may be mentioned α-methylstyrene, isoprene, styrene, methoxystyrene, methacrylates such as methylmethacrylate and ethylmethacrylates and acrylates such as methylacrylate and ethylacrylate.

In order to terminate the polymerization, a greater than the stoichiometric amount of a termination reagent such as water, alcohol and Lewis acid is added to the reaction mixture, whereby hydrogen atoms are introduced at the ends of the polymeric chain of the living polymer and the activation of the living polymer is eradicated. When a known electrophilic reagent capable of introduction of a functional group to anionic end of the living polymer, such as carbon dioxide, oxygen, formaldehyde, ethylene oxide, propylene oxide and carbon disulfide, is employed as the termination reagent, functional groups such as a carboxyl group, hydroxy group, methylol group, 2-hydroxyethyl group, 2-hydroxypropyl group and dithiocarboxyl group may be introduced to an end or ends of the polymeric chain. In this case, difunctional polymer, monofunctional polymer and the mixed polymer thereof are obtained by the polymerization reaction in a range of —40° C. or below, 0° C.~30° C. and —40° C.~0° C. respectively.

After the termination of polymerization, the mixture is subjected to distillation to remove the diluent, Lewis-base and the other reagent added in excess.

Thus, the various kinds of polymer are obtained after separation and purification comprising precipitation, filtration, washing and other preferred procedures.

The polymer obtained by this process has an extremely narrow-distribution of molecular weight. In this process, the ratio of weight average molecular weight to numerical average molecular weight of the polymer is in a range from 1.0 to 1.2, and the degree of polymerization of the polymer is a number in a range from two to the number limited technically.

Thus, the obtained polymer having a degree of polymerization in a range from 2 to 5 is used as a raw materials for the preparation of paint, plasticizer, adhesive and as intermediates for various organic chemicals, the polymer having a degree of polymerization in a range from 2 to 300 may be used as a raw materials for the preparation of paint, latex, plasticizer and adhesive and as blending materials for rubber and rocket propellent and as prepolymer to be employed in casting articles, and the polymer having a degree of polymerization in a range of 200 or more is utilized as rubber blending material and the raw materials for casting articles and synthetic rubber.

The non-limiting examples of this invention are illustrated as follows:

EXAMPLE I

To a 500 ml. flask attached with an air-tight agitator, a reflux condenser, a gas inlet, a reactant addition inlet and a thermometer, 100 ml. of tetrahydrofuran and 2 g. of o-terphenyl were added to dissolve. The air in the flask was replaced by nitrogen gas. Then, 28 g. of sodium, as sodium dispersion having an average particle size of 8μ and maximum particles size of 25μ, which was produced from 1 part (weight) of sodium and 1 part (weight) of kerosene, was added to the solution to obtain the deeply brown mixture containing sodium-o-terphenyl complex and a large excess amount of sodium dispersion.

Under cooling at —70° C. and vigorous agitation, 141.6 g. of B.B fraction separated from thermal cracking gas and consisting of 38.2 weight percent (weight percent is indicated as percent in the following) of butadiene, 10.3% of n-butane, 7.5% of iso-butane, 17.8% of butene-1, 11.4% of trans-butene-2, 7.1% of cis-butene-2, 7.4% of iso-butylene, 0% of C₃-hydrocarbon and 0.2% of C₅-hydrocarbon, was introduced to the mixture for 4 hours at a uniform rate. To the obtained dark green mixture, 500 ml. of methanol was added, subsequently the mixture was changed to colorless. The mixture was heated and distilled to remove unreacted B.B fraction, methanol and tetrahydrofuran, and the residue was washed with water. 47.2 g. of 116~127° C.-fraction was obtained from the washed mixture by fractional distillation.

Molecular weight: Determined by cryoscopic method, 110.7. Calculated for $C_8H_{14}$ (octadiene), 110.2.
Refractive index: $n_D^{20}=1.4388$.
Constituents determined by gas liquid chromatography and infrared spectrography: 1,7-octadiene, 1.2%; 2,6-octadiene, 87.4%; 1,6-octadiene, 11.4%.
Yield: 85.8%.

EXAMPLE II

The dark green reaction mixture obtained by the same procedure as Example I was poured on a large excess of cracked solid carbon dioxide. The mixture was allowed to stand and unreacted carbon dioxide and B.B fraction was evaporated.

To the residue, 500 ml. of water was added under nitrogen atmosphere, and then the mixture was separated into two layers. The water was acidified by addition of diluted hydrochloric acid, and the tetrahydrofuran dissolved in the acidic solution was removed by distillation. 98.4 g. of mixed unsaturated dicarboxylic acid was obtained from the residual acidic solution by ether extraction. Constituents determined by gas liquid chromatography and infrared spectrography: 71.7% of $C_{10}$-dibasic acid consisting of sebacid acid, 2-ethylsuberic acid and 2,5-diethyladipic acid, 15.3% of $C_9$-monobasic acid comprising carboxylated butadiene dimer, 3.8% of $C_5$-monobasic acid, 1.9% of $C_{13}$-monobasic acid and 7.6% of carboxylic acid having high boiling point.

EXAMPLE III

To the dark green reaction mixture obtained by the procedure according to Example I, maintained at a temperature of −70° C., air excluding moisture and carbon dioxide was introduced for 4 hours at a rate of 3 liters per hour. During the introduction, the mixture became reddish brown and viscous gradually accompanied with heat of reaction, subsequently, the mixture became yellow brown and the giving off of heat ceased. After expelling the dissolved oxygen by introduction of nitrogen, 50 ml. of methanol was added to the mixture. Unreacted B.B fraction was recovered from the mixture by distillation. 200 ml. of water was added to the mixture and the mixture was allowed to stand to become two layers. The water layer was neutralized by addition of diluted hydrochloric acid, and it was condensed by vacuum distillation. 64 g. of organic matter was obtained by ether extraction. By analysis, existence of a small amount of ester and carboxylic acid in this matter was detected. The saponifiable matter was removed by saponification and unsaponified matter was subjected to vacuum distillation. 48.6 g. of 100–128° C./1 mm. Hg-fraction was obtained.

Hydroxyl value: Calculated for $C_8F_2$-diol, 789.0. Found, 755.
Iodine: Calculated for $C_8F_2$-diol, 357.0. Found, 339.9.
Constituents determined by gas liquid chromatography after acetylation: 2,6-octadiene-diol-1,8, 28.8%; 1,6-octadiene - diol - 3,8, 49.0%; 1,7 - octadiene - diol-3,6, 18.5%; $C_8F_2$-alcohol, 3.7%.
Yield of $C_8F_2$-diol was 66% of the theoretical amount.

EXAMPLE IV

To a pyrex autoclave, 100 ml. of tetrahydrofuran and 2 g. of o-terphenyl was added to dissolve. The air in the autoclave was replaced by nitrogen gas. 28 g. of sodium was added as dispersion to the solution.

Under cooling at 0° C. and vigorous agitation, 141.6 g. of the same B.B fraction as in Example I was introduced to the mixture for 4 hours at a uniform rate. 60 ml. of ethyleneoxide was added to the mixture, subsequently the mixture changed to reddish brown.

200 ml. of water was added to the mixture under nitrogen atmosphere, and then the mixture was distilled to remove unreacted B.B fraction and ethylene oxide. The residue was separated into two layers. The water layer was neutralized by addition of diluted hydrochloric acid and concentrated. By ether extraction, 62.0 g. of organic matter was obtained. 54.8 g. of 60–70° C./1 mm. Hg-fraction was obtained by vacuum distillation.

Hydroxyl value: Calculated for $C_{10}F_2$ alcohol, 363.6. Found, 331.
Iodine value: Calculated for $C_{10}F_2$ alcohol, 329.0. Found, 317.
Constituents determined by gas liquid chromatography after acetylation: $C_{10}F_2$-alcohol (total of three isomers) 84.5%.
Yield of $C_{10}F_2$ as compared to the theoretical amount: 60.1%.
Byproduct detected: $C_{12}F_2$-diol, $C_6F_1$ alcohol, $C_{14}F_3$-alcohol and hydrocarbon.

EXAMPLE V

To a Pyrex flask, 30 ml. of tetrahydrofuran and 2 g. of o-terphenyl was added to dissolve. The air in the flask was replaced by nitrogen gas. Then 1.15 g. of sodium, as sodium dispersion having an average particle size of $12\mu$ and maximum particle size of $30\mu$ was added to the solution to obtain a deep green mixture.

Under cooling at −40° C., 94.5 g. of liquid B.B fraction from naptha cracking gas consisting of 28.6% of butadiene, 17.2% of n-butane, 17.7% of iso-butane, 9.3% of butene-1, 11.1% of trans-butene-2, 4.6% of cis-butene-2, 11.5% of iso-butylene, 0% of $C_3$ and $C_5$-hydrocarbon, was introduced to the mixture for 3 hours at a uniform rate. To the obtained yellow brown mixture, 2.4 ml. of methanol was added, subsequently the mixture was changed to colorless. The mixture was heated and distilled to remove unreacted B.B fraction, and the residue was washed with water.

The upper organic layer was distilled to remove tetrahydrofuran. To the residue, 50 ml. of methanol was added, and the mixture was agitated under heating. After the above washing, methanol was removed by decantation, and the residue was dried under evacuation to yield 25.9 g. of viscous polybutadiene. Yield calculated with respect to butadiene, 95.9%.

The numerical average molecular weight was determined by the vapor pressure osmometric method of benzene solution, and was found to be 1,126, corresponding to 20.8 of the numerical average degree of polymerization. The values agreed in a range of allowable error in measurement with 20 of the numerical average degree of polymerization and 1,084 of the numerical average molecular weight calculated from the molar ratio of butadiene to sodium. Butadiene oligomer did not exist in the methanol solution, indicating narrow distribution of molecular weight of the polymer.

EXAMPLE VI

To the yellow brown polymerization reaction mixture obtained by the procedure according to Example V, 3.5 g. of propylene oxide was added under cooling at −40° C. A red gel was formed. Treatment of the reaction mixture was executed according to Example V, and 28.3 g. of colorless viscous was obtained. Numerical average molecular weight was determined by vapor pressure osmometric method: 1,150.

The existence of secondary hydroxyl group was indicated by infrared spectrography. Hydroxyl value measured by pyridineacetic acid anhydride method was 94.4. According to these facts, the material should be polybutadiene-diol formed by introduction of a 2-hydroxyl group in both polymeric ends of polybutadiene.

EXAMPLE VII 26.1 g. of polybutadiene was obtained by the procedure according to Example V, except that 25 ml. of 1,2-dimethoxyethane and 0.345 g. of lithium as 25% of lithium dispersion having an average particle size of 7μ prepared by the usual method comprising the addition of lithium solution in liquid ammonia to toluene were employed instead of 30 ml. of tetrahydrofuran and 1.15 g. of sodium as sodium dispersion in Example V. Yield: 96.7%, 1,044 of numerical average molecular weight and 19.3 of numerical average degree of polymerization determined by vapor pressure osmometric method were in good agreement with the value calculated by molar ratio of butadiene against lithium.

EXAMPLE VIII

To the yellow brown polymerization reaction mixture obtained by the procedure according to Example V, 26 g. of styrene was added maintaining the temperature at −40° C. 51.5 g. of colorless viscous matter was obtained by the treatment according to Example V. Numerical average molecular weight, 2,162. Content of styrene determined by infrared spectrography, 49.5%. It was certified that styrene and butadiene homopolymers did not exist in the material by the fact that no precipitation occured by the addition of iso-octane to the toluene solution thereof and that no extract was obtained by extraction thereof with iso-octane.

Accordingly, it was confirmed that the material was pure butadiene-styrene block copolymer.

EXAMPLE IX

To the red polymerization reaction mixture obtained by the procedure according to Example VIII, 10 g. of powdered carbon dioxide was added, and the mixture was agitated vigorously. Unreacted carbon dioxide and B.B fraction were evaporated by allowing to stand until a rise of the temperature of the mixture to room temperature occurred. Tetrahydrofuran was removed by distillation from the upper layer of the mixture separated into two layers. 50 ml. of methanol was added to the residue, and the mixture was agitated under heating. Methanol employed in the above washing was removed by decantation. After drying of the residue, 52.8 g. of colorless viscous matter was obtained.

Numerical average molecular weight by vapor pressure osmometric method: 2,310.
Neutralization value: 480.
Content of styrene by infrared spectrography: 47.8.

It was confirmed that butadiene and styrene homopolymers did not exist in the material, accordingly the material was butadiene-styrene block copolymer having two carboxyl groups at both polymeric ends. The confirmation was by the iso-octane precipitation method and iso-octane extraction method.

EXAMPLE X

To a Pyrex flask, 5 ml. of tetrahydrofuran and 0.04 g. of o-terphenyl was added to dissolve. The air in the flask was replaced by nitrogen gas. Then 1.23 g. of sodium, as sodium dispersion having an average particle size of 10μ and maximum particle size of 25μ, was added to the solution to obtain a deep brown mixture.

Under cooling at −60° C., 459 g. of liquid B.B fraction from dehydration of n-butane by the houdry system and consisting of 11.8% of butadiene, 49.6% of n-butane, 1.1% of iso-butane, 34.9% of butene-1 and butene-2, 1.2% of iso-butylene, 1.4% of $C_3$ and $C_5$-hydrocarbon, was introduced to the mixture for 4 hours at a uniform rate. According to the course of the reaction, the color of the mixture was changed to dark green. To the obtained dark green mixture, 5 g. of powdered carbon dioxide was added, and the mixture was agitated vigorously. subsequently the mixture was changed to colorless. Unreacted carbon dioxide and B.B fraction were evaporated by allowing to stand until the temperature of the mixture rose to room temperature. The residue was then treated by the procedure according to Example IX. 53.7 g. of colorless and viscous matter was obtained.

Numerical average molecular weight by vapor pressure osmometric method, 11,040, and neutralization value, 9.9, indicated that the material was polybutadiene having two carboxyl groups at both polymeric ends. The above two values were in good agreement with those calculated from the molar ratio of butadiene to sodium in a range of allowable error of measurement.

EXAMPLE XI 51.2 g. of colorless viscous matter was obtained by the procedure according to Example X except that 0.05 g. of benzophenone and the reaction temperature at −20° C. were employed instead of 0.04 g. of o-terphenyl and the reaction temperature at −60° C. in Example X.

Numerical average molecular weight: 8,300, and neutralization value: 10.5, indicated that the material was the mixture of polybutadiene having two carboxyl groups at one end of the polymeric chain.

EXAMPLE XII 49 g. of colorless viscous matter was obtained by the procedure according to Example X except that a Pyrex autoclave, 5 ml. of 1,4-dioxane and the reaction temperature at 20° C. was employed instead of a Pyrex flask, 5 ml. of tetrahydrofuran and the reaction temperature at −60° C. in that example.

Numerical average molecular weight :5060, and neutralization value :10.1, indicated that the material was polybutadiene having one carboxyl group at one end of polymeric chain.

EXAMPLE XIII

To a pyrex autoclave, 5 ml. of tetrahydrofuran and 0.05 g. of biphenyl was added to dissolve. The air in the autoclave was replaced by nitrogen gas. To the solution, 0.23 g. of sodium was added as dispersion having an average particle size of 10μ and maximum particle size of 25μ to obtain a deeply blue mixture.

Under cooling at 0° C. and vigorous agitation, 459 g. of the same B.B fraction as in Example X and 52 g. of styrene were introduced to the mixture for 4 hours at a uniform rate. To the obtained red mixture, 1 ml. of glacial acetic acid was added, subsequently the mixture changed to colorless.

The mixture was distilled to remove unreacted B.B fraction, tetrahydrofuran and glacial acetic acid. The residue was washed with methanol by heating and agitation. After decantation of methanol, the residue was dried by evacuation. 96 g. of highly viscous polymer was obtained.

Numerical average molecular weight: 10,160.
Content of styrene determined by infrared spectrography: 51.4%.

It was certified that styrene and butadiene homopolymers did not exist in the polymer by the facts that no precipitation occured by addition of iso-octane to the toluene solution thereof and no extractant was obtained by extraction thereof with iso-octane. Accordingly it was confirmed that the polymer was pure butadiene-styrene block copolymer.

EXAMPLE XIV

To a 500 ml. Pyrex autoclave, 10 ml. of solution containing $2 \times 10^{-2}$ mole of potassium-naphthalene complex in 1 liter of tetrahydrofuran, was added under a nitrogent stream current: the solution was produced by the reaction of potassium membrane and naphthalene in tetrahydrofuran and subsequent removal of unreacted potassium by filtration.

Under cooling at 10° C. and agitating, 229 g. of the same B.B fraction as Example X was added to the solution for 4 hours. To the completed reaction mixture, 10 ml. of water was added and the mixture was heated and distilled to remove unreacted B.B fraction, tetrahydrofuran and water. The residual polymer was washed with 50 ml. of methanol under heating and agitation. Methanol was removed by decantation and the residual polymer was dried under reduced pressure.

25.0 g. of colorless highly viscous polymer was obtained. Intrinsic viscosity [ξ] in toluene at 30° C. was 0.719. Numerical average molecular weight from the intrinsic viscosity was calculated by the following equation:

$$[\xi] = 7.0 \times 10^{-4} M^{0.77}$$

wherein M is the numerical average molecular weight of polybutadiene (Reference: M. Szwarc: Journal of Polymer Science, vol. 25, page 221 (1957)), and it was 102,100.

The numerical average molecular weight from the ratio of molar concentration of butadiene to potassium was calculated by the following equation and it was 108,200.

Numerical average degree of polymerization=[Butadiene]/[Potassium]. Those two values of numerical average molecular weight found by two different methods agreed in a range of allowable error in measurement.

Weight average molecular weight measured by light-scattering method, 110,500. The ratio of weight average molecular weight to numerical average molecular weight was 1.08, indicating narrow distribution of molecular weight.

EXAMPLE XV

To a 500 ml. Pyrex flask, 5 ml. of tetrahydrofuran and 0.02 g. of o-terphenyl was added to dissolve. The air in the flask was replaced by nitrogen gas. Then, 0.0172 g. (0.0025 mole) of lithium, as 25% lithium dispersion having an average particle size of 5μ, was added to the solution to obtain a deep green mixture.

Under cooling at −70° C., 5 g. of B.B fraction from naphtha cracking gas and consisting of 56.9% of butadiene, 9.2% of n-butane, 11.4% of iso-butane, 16.1% of butenes, 6.1% of isobutylene, 0.3% $C_3$ and $C_5$-hydrocarbon was introduced to the mixture for 10 minutes and then the mixture of 90 g. of the same B.B fraction and 180 g. of n-hexane was poured for 4 hours at a uniform rate. To the obtained dark brown mixture, 1 ml. of methanol was added, subsequently the color of the mixture disappeared. The mixture was heated and distilled to remove unreacted B.B fraction, and the residue was washed with water.

The upper organic layer was distilled to remove tetrahydrofuran and n-hexane. To the residue, 100 ml. of methanol was added, and the mixture was agitated under heating. After the above methanol washing, methanol was removed by decantation, and the residue was dried under evacuation to yield 51.2 g. of viscous polybutadiene.

Intrinsic viscosity in toluene at 30° C. was 0.368. Numerical average molecular weight from the intrinsic viscosity was calculated by the question of Example XIV, and it was 42,750.

Numerical average molecular weight from the ratio of the molar concentratin of butadiene to lithium was calculated by the following equation and it was 45,500.

Numerical average polymerization degree=2 [Butadiene]/[Lithium].

Both numerical average molecular weights calculated by different methods agreed within a range of allowable error in measurement.

Subsequently, the polymer was fractionated in 8 fractions, by addition of methnol to the solution of polymer in benzene and the intrinsic viscosities of all fractions were measured to determine the distribution of molecular weight.

The result is shown in the following table:

| No. of Fraction | Percent | Intrinsic Viscosity | Molecular Weight |
| --- | --- | --- | --- |
| 1 | 3.4 | 0.607 | 81,890 |
| 2 | 8.3 | 0.490 | 62,010 |
| 3 | 18.7 | 0.416 | 50,120 |
| 4 | 34.8 | 0.394 | 46,720 |
| 5 | 21.5 | 0.313 | 34,640 |
| 6 | 7.0 | 0.247 | 25,480 |
| 7 | 3.3 | 0.224 | 22,440 |
| 8 | 3.0 | 0.183 | 17,260 |

It was shown that the distribution of the molecular weight was very narrow and the ratio of weight average molecular weight to numerical average molecular weight was 1.11.

What we claim is:

1. Method of producing living polybutadiene, which comprises reacting the $C_4$ fraction obtained by fractional distillation of cracking gas produced by cracking of naphtha or dehydrogenation of $C_4$-paraffins and $C_4$-olefins, with a dispersion or a mirror of an alkali metal of the group consisting of sodium, potassium, cesium rubidium and mixtures thereof, said dispersion having a particle size of less than 50μ average diameter and less than 200μ maximum diameter, in the presence of an activator of the group consisting of condensed ring aromatic hydrocarbons, polynuclear aromatic hydrocarbons constituted of bonded, non-condensed rings, polynuclear aromatic hydrocarbons constituted of bonded, condensed rings, benzophenone, 1 - naphthylphenylketone, 2 - naphthylphenylketone, dinaphthylketone, 4 - vinylpyridine and 2 - vinylfuran, the activator being in the form of an alkali metal complex, and a Lewis base of the group consisting of dimethylether, methylethylether, 1,2 - dimethoxyethane, 2,2′ - dimethoxy - diethylether, tetrahydrofuran, 1,4 - dioxane, methylal, 1,1 - dimethoxyethane, trimethylamine, triethylamine and N-methylmorpholine, the weight ratio of the Lewis base to the alkali metal being more than 3:1, at a temperature of about −100° C. to −40° C. in an inert gas atmosphere.

2. Method of producing living butadiene copolymer, which comprises reacting a monomer of the group consisting of methylstyrene, isoprene, styrene, methoxystyrene, methylmethacrylate, ethylmethacrylate, methylacrylate, ethylacrylate and methacrylonitrile, and the $C_4$ fraction obtained by fractional distillation of cracking gas produced by cracking of naphtha and dehydrogenation of $C_4$-paraffins and $C_4$-olefins, with a dispersion or a mirror of an alkali metal of the group consisting of sodium, potassium, cesium, rubidium and mixtures thereof, said dispersion having a particle size of less than 50μ average diameter and less than 200μ maximum diameter, in the presence of an activator of the group consisting of condensed ring aromatic hydrocarbons, polynuclear aromatic hydrocarbons constituted of bonded, non-condensed rings, polynuclear aromatic hydrocarbons constituted of bonded, condensed rings, benzophenone, 1-naphthylphenylketone, 2 - naphthylphenylketone, dinaphthylketone, 4 - vinylpyridine and 2 - vinylfuran, the activator being in the form of an alkali metal complex, and a Lewis base of the group consisting of dimethylether, methylethylether, 1,2-dimethoxyethane, 2,2′-dimethoxydiethylether, tetrahydrofuran, 1,4 - dioxane, methylal, 1,1 - dimethoxyethane, trimethylamine, triethylamine and N-methylmorpholine, the weight ratio of the Lewis base to the alkali metal being more than 3:1, at a temperature of about −100° C. to −40° C. in an inert gas atmosphere.

3. Method according to claim 1, further comprising adding to the reaction mixture a stoichiometric excess of a termination agent of the group consisting of acetic acid, water, alcohols, and mixtures thereof, as a termination agent.

4. Method according to claim 2, further comprising adding to the reaction mixture a stoichiometric excess of a termination agent of the group consisting of acetic acid, water, alcohols, and mixtures thereof.

5. Method according to claim 1, further comprising adding to the reaction mixture at least one electrophilic agent selected from the group consisting of carbon dioxide, oxygen, formaldehyde, ethylene oxide, propylene oxide and carbon disulfide, whereby the polybutadiene produced has functional groups of the group consisting of carboxyl, hydroxyl, methylol, 2-hydroxyethyl, 2-hydroxypropyl and dithiocarbonyl.

6. Method according to claim 2, further comprising adding to the reaction mixture at least one electrophilic agent selected from the group consisting of carbon dioxide, oxygen, formaldehyde, ethylene oxide, propylene oxide and carbon disulfide, whereby the butadiene copolymer produced has functional groups of the group consisting of carboxyl, hydroxyl, methylol, 2-hydroxyethyl, 2-hydroxypropyl and dithiocarbonyl.

7. Method according to claim 1, in which the alkali metal is present in a stoichiometric excess relative to the activator and the reaction is carried out by adding the $C_4$ fraction to the alkali metal, activator and Lewis base sufficiently slowly that the alkali metal is completely consumed, whereby propagation does not take place, until the molar ratio of butadiene in the $C_4$ fraction added to the alkali metal is from 1 to 5.

8. Method according to claim 2, in which the alkali metal is present in a stoichiometric excess relative to the activator and the reaction is carried out by adding the $C_4$ fraction to the alkali metal, activator and Lewis base sufficiently slowly that the alkali metal is completely consumed, whereby propagation does not take place, until the molar ratio of butadiene in the $C_4$ fraction added to the alkali metal is from 1 to 5.

9. The method according to claim 1 wherein the activator is present in an amount of between about 0.001 to 1 molecule per each atom of alkali metal.

10. The method according to claim 1 wherein the activator is present in an amount of between about 0.0001 and 0.1 molecule per each atom of alkali metal.

11. The method according to claim 1 wherein the inert gas atmosphere is a nitrogen atmosphere.

12. The method according to claim 2 wherein said $C_4$ fraction and said comonomer are alternately added to the reaction mixture.

13. The method according to claim 2 wherein said $C_4$ fraction and at least two different kinds of said comonomer are alternately added to the reaction mixture.

References Cited

UNITED STATES PATENTS

| | | |
|---|---|---|
| 2,181,771 | 11/1939 | Scott. |
| 2,264,811 | 12/1941 | Rothrock. |
| 3,105,828 | 10/1963 | Porter. |
| 3,135,716 | 6/1964 | Uraneck et al. _____ 260—880 |
| 3,157,604 | 11/1964 | Strobel. |
| 3,317,918 | 5/1967 | Foster _____ 260—83.7 |
| 3,346,666 | 10/1967 | Dennis _____ 260—879 |
| 3,307,785 | 7/1967 | Boyd _____ 260—2.5 |

FOREIGN PATENTS

| | | |
|---|---|---|
| 520,873 | 1/1956 | Canada. |

JOSEPH L. SCHOFER, Primary Examiner

WILLIAM F. HAMROCK, Assistant Examiner

U.S. Cl. X.R.

260—80.7, 82, 82.3, 83.3, 83.7, 88.2, 880